Nov. 18, 1924.

L. WALLERSTEIN 1,516,166

PROCESS AND APPARATUS FOR RECOVERING GASOLINE FROM NATURAL GAS

Filed April 30, 1919

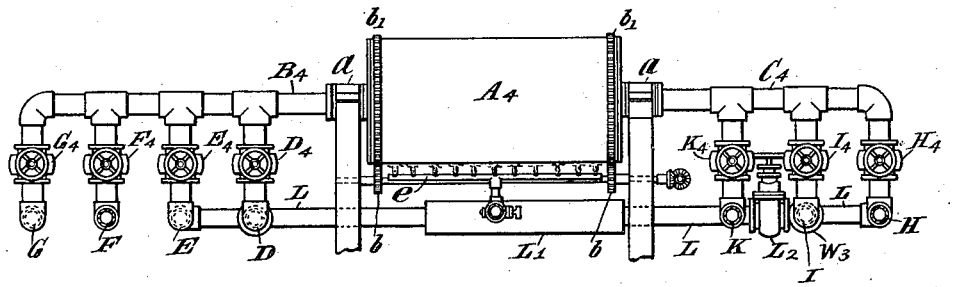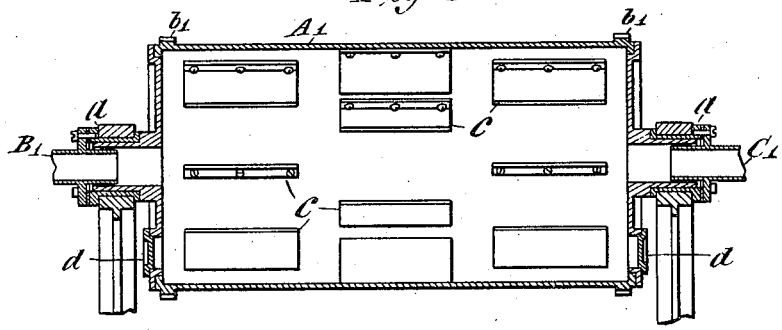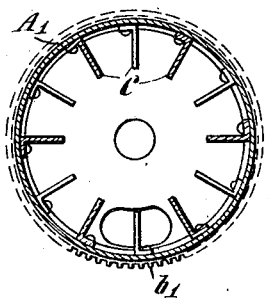

Patented Nov. 18, 1924.

1,516,166

UNITED STATES PATENT OFFICE.

LEO WALLERSTEIN, OF NEW YORK, N. Y., ASSIGNOR TO GASOLINE RECOVERY CORPORATION, A CORPORATION OF DELAWARE.

PROCESS AND APPARATUS FOR RECOVERING GASOLINE FROM NATURAL GAS.

Application filed April 30, 1919. Serial No. 293,802.

*To all whom it may concern:*

Be it known that I, LEO WALLERSTEIN, a citizen of the United States, residing at New York, county of New York, and State of New York, have invented certain new and useful Improvements in Processes and Apparatus for Recovering Gasoline from Natural Gas, fully described and represented in the following specification and the accompanying drawings, forming a part of the same.

The present invention relates to a process of recovering gasoline from natural gas.

The object of the invention is to provide a process which while simple and inexpensive in operation, and requiring but a relatively low investment for apparatus, will give a high efficiency in removal of gasoline and will not materially reduce the gas pressure.

The invention consists in contacting the natural gas containing the gasoline with absorbent carbon (such for example as that used in gas masks) whereby the gasoline is absorbed from the natural gas and the latter allowed to pass on. When the absorbent carbon is sufficiently charged with gasoline, it is heated out of contact with air, and the gasoline driven off and condensed.

Good absorbent carbons absorb gases or vapors in proportion to their molecular weights, so that such carbons in contact with a mixture of gases and vapors exercise a selective absorbing action, such that the vapors are absorbed in preference to the gases, because of course the vapors have the higher molecular weights.

The accompanying drawings illustrate an apparatus suitable for carrying out the process.

In the drawings,—

Fig. 2 is a side view of the apparatus; and

Figs. 3 and 4 are detail views of one of the drums.

Figure 1:
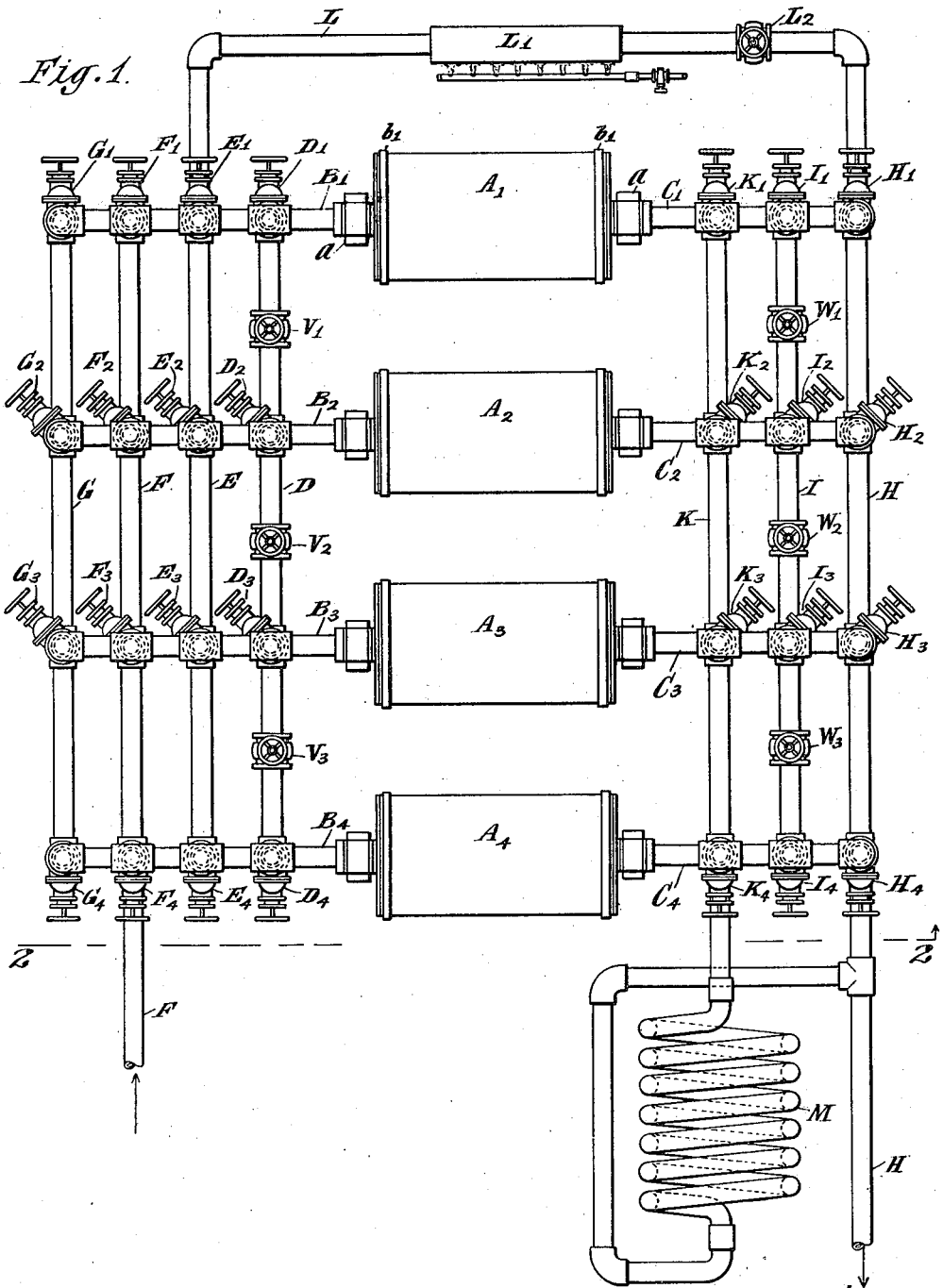
Fig. 1 is a diagrammatic plan view.

In carrying out the process on a commercial scale the natural gas may be brought into contact with the absorbent carbon in various ways as for example by passing a current of the gasoline-laden natural gas through a bed or beds of absorbent carbon until such carbon is sufficiently charged with gasoline to justify the discontinuance of the contact treatment. The natural gas by its passage through the carbon is freed from its gasoline content either wholly or in part and may then be used for its customary purposes.

When the absorbent carbon has been sufficiently charged with gasoline it may be treated in any suitable way to drive off the gasoline, and to render it suitable for use again as an absorbent.

Where the carbon is arranged in a plurality of beds through which the gas is passed in series, that bed or those beds with which the gas contacts first may and generally will become charged with gasoline to the desired point before the succeeding beds become charged, and it is sometimes an advantage to discontinue the supply of gas to these first charged beds, treat them for the removal of the absorbed gasoline and then use them as the last bed of the series.

However, since there is a loss of gas pressure in passing the gas through a bed or beds of absorbent carbon, and since a loss of pressure is often a disadvantage, particularly when the gas must flow a long distance through mains to the place of use, I have devised a method of absorption which does not involve any substantial loss of pressure. In this method the particles of absorbent carbon are allowed to fall through a stream of natural gas on its way from the well to the place where it is to be used. That is to say, there is a shower of carbon particles through the natural gas and this shower is maintained continuously, and the particles are used repeatedly to form this shower until the particles are sufficiently charged with the absorbed gasoline. It is best to cause this shower to fall in a direction transverse to the direction of flow of the gas since in this way there is less chance of a diminution in the gas pressure.

A simple way of carrying out this method is to pass the gas through a rotating drum, in a direction generally parallel to the axis of rotation, the drum being partly filled with carbon particles of the desired size.

The interior of the drum is provided with vanes or wings, which, as the drum rotates, lift the carbon particles from the bottom of the drum toward its top and shower these particles through the gas. It is understood that the drum has its axis arranged in a horizontal or inclined direction. By using a drum of large internal diameter relative to the gas mains which serve as inlets and outlets, there will be but little loss of pressure.

The larger the interior or diameter of the drum the slower the travel of the gas therein and hence the greater the time for contact of gas and carbon.

Whatever the method of contacting the carbon particles and the gas, the gas should travel in contact with carbon until it has lost as much gasoline as it is desired to remove. The carbon should be kept in use absorbing gasoline from the gas until it is so charged with gasoline that its rate of absorbtion is materially reduced.

In order to separate the gasoline from the carbon which has absorbed it several methods may be employed.

For example, the supply of the natural gas to the carbon may be discontinued and then the carbon and its absorbed gasoline may be subjected to heat to evaporate the gasoline, which is led off and cooled to condense it.

A simple and most effective way to drive off the gasoline is to pass a heated gas through the carbon and then cool the gas to a temperature at which it will precipitate all or most of the gasoline.

While this heated gas advantageously should be non-combustible inert gas such for example as $CO_2$, nitrogen, or gas diluted with $CO_2$ or nitrogen, yet the invention is not to be limited to this, because some of the natural gas stripped of its gasoline may be heated and passed in contact with the carbon, suitable precautions being taken to prevent mixture of air with the gas such as might result in explosions.

Referring to the drawings, $A_1$ to $A_4$ represent rotary drums each of the drums being mounted on suitable bearings $a$, and driven by gearing as indicated at $b$, $b_1$, Fig. 2, in the usual way. Each drum has its interior provided with vanes or ribs $c$, Fig. 3, which serve to lift and drop the comminuted carbon. Each drum also has a manhead cover $d$, Fig. 3, by which it may be charged with carbon particles, and discharged when necessary. The drums may be suitably heated, as, for example, by gas burners $e$, Fig. 2.

Each end of each drum is connected with an inlet pipe $B_1$ and $B_4$ and an outlet pipe $C_1$ to $C_4$ by any suitable joint which will permit rotation of the drum while the pipes remain stationary, the joint being gas tight.

Each pipe $B_1$ to $B_4$ is connected to four mains D, E, F, and G, respectively, suitable shut-off valves, $D_1$ to $D_4$ $E_1$ to $E_4$ $F_1$ to $F_4$ and $G_1$ to $G_4$ being provided to control the connections.

Each pipe $C_1$ to $C_4$ is connected to three mains H, I, and K, respectively, suitable shut-off valves $H_1$ to $H_4$, $I_1$ to $I_4$ and $K_1$ to $K_4$ being provided to control the connections.

The main F is supplied with fresh natural gas coming from the well, this being the gas which is charged with gasoline. The pipe D serves as a cross-over pipe for connecting the drums in series, as more fully explained hereinafter, and has a series of intermediate valves $V_1$ to $V_3$, respectively.

The main H is a discharge gas main which carries off the gas which has been deprived of its gasoline.

The pipe I serves as a cross-over pipe for a purpose similar to that of the pipe D, and has a series of intermediate valves $W_1$ to $W_3$ inclusive.

The main K is connected to a condenser M, Fig. 1.

The main E is connected to the main H, so as to lead some stripped gas into the drums, by means of a pipe L which may be suitably heated by a gas heater $L_1$.

In starting the apparatus, each drum is filled to the desired extent, for example one half full, with comminuted absorbent carbon.

The carbon particles or granules may be of any desired size but it is advantageous to employ larger granules than has heretofore been used with gas masks. I prefer to use granules as large as one fourth to one half inch in diameter. It is true that the surface of such granules is less in proportion to the cubic contents of the granules, but by using enough of the carbon and enough drums, the required absorption area may be obtained. The larger granules do not pack so tightly as the smaller ones and hence more of the absorbent surface is exposed to the gas.

At the beginning of operations the drums are not heated and should be at about 40° C. because during the absorption of the gasoline there is a rise in temperature and if the temperature is allowed to rise too high the absorptive power of the carbon is materially reduced.

Asuming now that the gas is to enter first into the drum $A_1$, then into the drums $A_2$ and $A_3$ and then to pass to the discharge main H, the valve $F_1$ is opened to connect the natural gas main F and the inlet $B_1$. Valves $E_1$, $D_1$ and $G_1$ are closed.

The outlet pipe $C_1$ of the drum $A_1$, is put in communication with the cross-over pipe I, by opening the valve $I_1$, the valves $H_1$ and $K_1$ being closed.

The drum $A_2$ is put in communication with the cross-over pipe I by opening the valve $I_2$, the valves $H_2$ and $K_2$ being closed.

Also, the drum $A_2$ has its pipe $B_2$ put in communication with the cross-over pipe D by opening the valve $D_2$, the valves $E_2$, $F_2$ and $G_2$ being closed. The drum $A_3$ is put in the circuit by opening the valves $D_3$ and $H_3$, its other valves being closed. Through the valve $H_3$ it is connected to the discharge gas main H.

The natural gas will flow from the main F through the drum $A_1$ in one direction, thence through the drum $A_2$ in the reverse direction, thence through the drum $A_3$ in the original direction to the main outlet or discharge H.

By rotating the drums, the carbon particles are lifted and dropped in the gas stream and thus are brought into contact with the gas in such a way that each particle has an opportunity to absorb the gasoline. The absorption of gasoline will be most rapid in the first drum entered by the fresh gas, and the operation is continued until the particles in this drum are sufficiently charged with gasoline. This can be determined by removing samples of gas and testing it or by testing samples of the carbon. When this stage has been reached, the valves $F_1$ and $I_1$ are closed, so as to cut off the drum $A_1$. The drum $A_4$ is included in the path of the gas by the proper cross-over connections, and is connected to the main H by opening the valve $H_4$, the valve $H_3$ being closed. The valve $F_2$ is opened to admit the fresh gas to the drum $A_2$, and the other valves are so set that the gas flows through drum $A_2$ thence in a reverse direction through $A_3$ thence in the original direction through $A_4$ to the main H. The absorption is continued until the carbon in $A_2$ is sufficiently charged with gasoline.

In the meantime the carbon in $A_1$ is treated to remove the gasoline.

To do this the drum $A_1$ is heated by lighting the burners under it, and it is put in communication with the condenser by opening the valve $K_1$ to the pipe K which leads to the condenser M.

In order to assist in sweeping off the gasoline vapors, a limited amount of heated gas may be passed through the drum $A_1$ by opening the valves $E_1$ and $L_2$ which admit stripped gas from the main H, this gas passing the heater L.

The heated gas passes out through the condenser, and being cooled therein, deposits the gasoline to a large extent. The temperature to which the contents of the drum is raised should be about 140° to 160° C.

When the drum $A_1$ is deprived of its gasoline it may be made the last drum of a new series of drums by opening the proper valves of the pipe G, this pipe serving as a reverse cross-over pipe. The drum $A_1$ should, however, be allowed to cool before it is used again in the system, as otherwise the carbon will not be very absorptive. The cooling may be hastened by spraying the drum with water.

The cross-over pipes D and I are provided with the valves $V_1$ to $V_4$ and $W_1$ to $W_4$, respectively, to prevent the direct flow of gas and vapor from the first drum to any other drum beyond the cross-over connection which is in use, these valves being open when their respective sections of pipe D or I are in use as cross-over connections, but are closed at other times.

What is claimed is:

1. The process of recovering gasoline from natural gas which consists in contacting the natural gas with a shower of absorbent carbon in a solid state, whereby the gasoline is absorbed by the carbon, then subjecting the carbon and the absorbed gasoline to a distilling treatment to vaporize the gasoline, and finally condensing the gasoline.

2. The process of recovering gasoline from natural gas, which consists in flowing the natural gas in contact with a shower of comminuted absorbent carbon until the natural gas is substantially freed of its gasoline and then allowing it to escape from such contact, maintaining the carbon shower in the presence of flowing natural gas for a time sufficient to charge fully the first portion of the carbon with gasoline, then cutting off the flow of gas, subjecting the carbon in situ to treatment to carry off the gasoline from the carbon, collecting said gasoline in liquid form, and then again flowing natural gas into contact with such carbon.

3. The process of recovering gasoline from natural gas, which consists in causing the gas to travel in contact with a shower of particles of comminuted absorbent carbon until most of the gasoline content of the natural gas has been removed, and continuing the supply of fresh gas to the carbon until the rate of absorption of the gasoline by the carbon has materially lessened, then in the absence of the fresh natural gas, subjecting the carbon and its absorbed gasoline to heat to vaporize the gasoline, and condensing and collecting the latter.

4. The process of recovering gasoline from natural gas which consists in contacting the natural gas with absorbent carbon in a solid state and agitating said absorbent while the gas is contacting therewith, whereby the gasoline is absorbed by the carbon, then subjecting the carbon and the absorbed gasoline to a distilling treatment to vaporize the gasoline and finally condensing the gasoline vapors.

5. An apparatus for separating gasoline from natural gas, comprising a container, a mass of solid absorbent material in comminuted form arranged in said container and capable of absorbing gasoline vapor from natural gas, means for introducing natural gas into said container, means for agitating said medium, means for heating said solid absorbent medium in order to drive off absorbed vapors, means for condensing the vapors driven off and means for collecting condensate from the condensing means.

6. A process for the recovery of condensible vapors from gases which consists in forming a spray of solid, sorbent material in an atmosphere of gas containing condensible vapors.

In testimony whereof I have hereunto set my hand.

LEO WALLERSTEIN.